May 8, 1962  A. L. DIETZE  3,033,913
JUNCTION BOX
Filed July 13, 1959

Allen L. Dietze
INVENTOR.

BY *Clarence A. O'Brien*
and *Harvey B. Jackson*
Attorneys

United States Patent Office 3,033,913
Patented May 8, 1962

3,033,913
JUNCTION BOX
Allen L. Dietze, 812 Terrell, Cuero, Tex.
Filed July 13, 1959, Ser. No. 826,616
2 Claims. (Cl. 174—60)

This invention relates generally to electrical equipment and more particularly to a novel junction box construction for utilization in commercial and residential wiring.

In residential wiring, Romex type wire is utilized. Often, it is desirable to form additional electrical outlets in the home. Heretofore, in order to provide additional electrical outlets, several junction boxes, covers, splices with solder and tape or some sort of solder disconnectors, and Romex type wire clamps or connectors to outlet boxes were needed or in lieu thereof new wire runs had to be run into an existing outlet and connected, requiring a great deal of time, skill and materials. Although terminal blocks, inserts, etc., have been utilized in conjunction with this type of wiring, no satisfactory devices specifically designed for the purpose of providing additional electrical outlets to existing Romex type runs or to new Romex type runs were available. Accordingly, it is the principal object of this invention to provide a novel junction box construction specifically designed for facilitating commercial and residential wiring utilizing Romex type wire.

More particularly, it is an object of this invention to provide easy, inexpensive, and safe means for connecting new wire runs to an existing run for the purpose, for example, of providing convenient additional electrical outlets. By utilizing the junction box forming the subject matter of this invention, considerable amounts of labor, materials, and time are saved.

In accordance with the above stated objects, below is particularly described the construction and utilization of the novel junction box construction forming the subject matter of this invention. Initially, the junction box includes an upper and lower box member. The lower box member has an upstanding wall extending about the periphery thereof and electrically conductive terminal strips secured to the top surface of the wall. Conductive screws are threaded into the wall and are adapted to secure and connect wires to the terminal strips. Openings are formed in the wall for passing the wires into the box. Further, the wall defines a shoulder surface, beneath the top surface of the wall, extending around the outer edge of the wall. The upper box member has a depending peripheral wall which is adapted to abut the upstanding wall of the lower box member. An apron portion forms a part of the depending wall and engages the shoulder surface and the wires extending through the openings into the box when the box is closed. Cavities are provided in the lower box member in alignment with the openings for receiving setscrews which are adapted to engage the incoming Romex wire so as to prevent its movement and relieve any mechanical stress on the screws within the box electrically connecting the wires to the terminal surface.

Other objects and advantages which will become subsequently apparent reside in the details of construction and operation as more fully hereinafter described and claimed, reference being had to the accompanying drawings forming a part hereof, wherein like numerals refer to like parts throughout, and in which:

With continuing reference to the drawings, the numeral 10 generally represents the junction box comprising this invention and particularly adapted to receive and connect the conductors of Romex cables as 12, 14 and 16.

Figure 1:
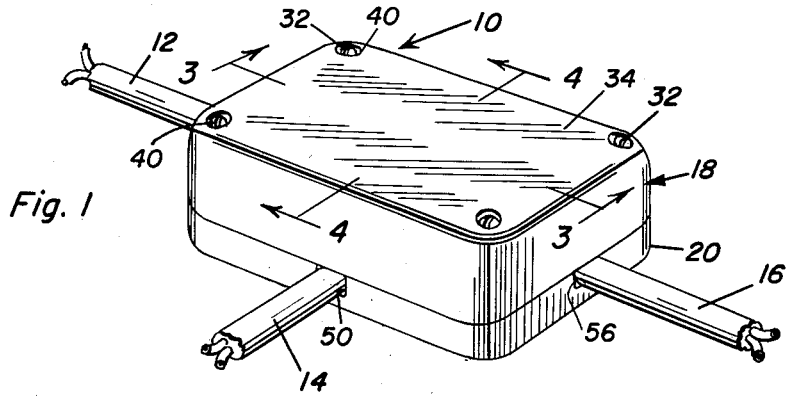
FIGURE 1 is a perspective view of the junction box and illustrates a plurality of Romex cables entering the box.
Figure 3:
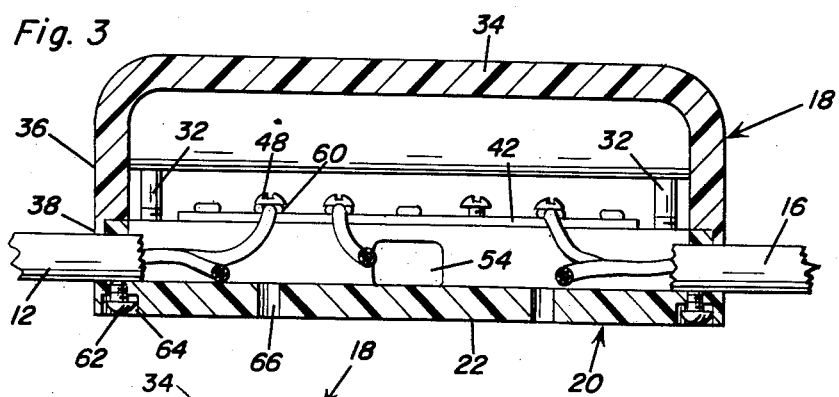
FIGURE 3 is a vertical sectional view taken substantially upon the plane of the section line 3—3 of FIGURE 1 indicating the internal box construction.
Figure 4:
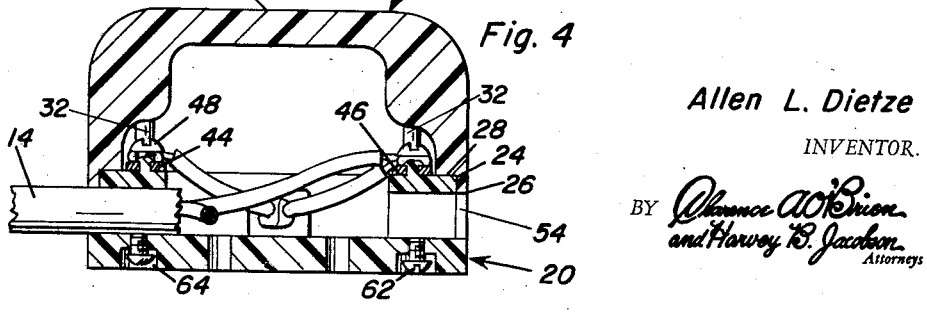
FIGURE 4 is a vertical sectional view taken substantially along the plane of the section line 4—4 of FIGURE 1 further illustrating the internal construction of the box.

The junction box 10 initially includes an upper box member 18 and a lower box member 20. It is contemplated that the box to be constructed of an insulative material as plastic, porcelain, etc. The lower box member 20 has a bottom surface 22 and an upstanding peripheral wall 24 extending about the entire perimeter of the bottom surface 22. Around the outer peripheral surface of the wall 24 is a ledge or shoulder surface 26 which is disposed below the top surface 28 of the wall 24. Apertures 30 are disposed in each corner of the lower box member 20 for the purpose of receiving bolts 32 extending downwardly through the upper box member 18 to secure the upper box member 18 to the lower box member 20. The upper box member 18 includes a top area 34 and a peripheral depending wall 36 which has an apron 38 formed thereon. When the box 10 is closed as is illustrated in FIGURES 1, 3 and 4, the bolts 32 extend through the upper box member 18 and into the apertures 30 formed in the wall 24 of the lower box member 22. The heads of the bolts 32 are accommodated in depressions 40 formed in the top area 34.

Figure 2:
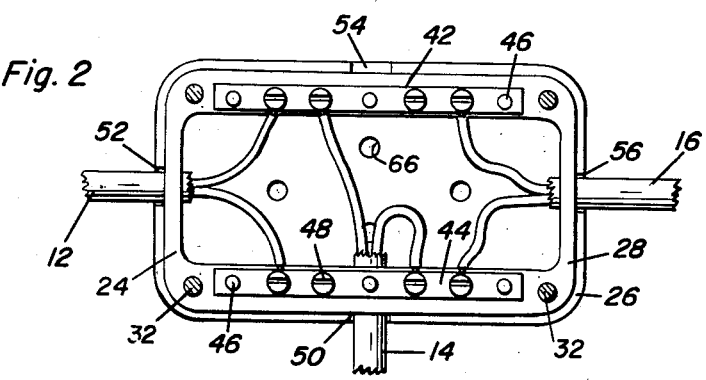
FIGURE 2 is an elevational plan view of the junction box with the upper box member removed.

A pair of terminal strips 42 and 44 are secured on the top surface 28 of the wall 24 as by screws or rivets 46. Of course, the terminal strips 42 and 44 are conductive and have apertures therein receiving terminal screws 48. In order to lead the cables 12, 14 and 16 into the box 10, openings are provided in the lower box member 20. Inasmuch as the Romex cable is, as a general rule, substantially rectangular, the openings may be likewise substantially rectangular and extend through the wall 24 as most clearly illustrated in FIGURE 4. The openings are generally designated by the numerals 50, 52, 54 and 56 (FIG. 2). The openings are horizontally aligned and it may be seen, as is particularly illustrated in FIGURE 4, that the top of the opening registers with the shoulder surface 26 so that extremely good access into the openings is provided. Accordingly, in use, the Romex cables 12, 14 and 16 are brought through the respective openings 52, 50 and 56. The inner conductors of the respective cables are connected to the terminal strips 42 and 44 by securing the conductors, as 60 beneath a terminal screw 48 in engagement with a terminal strip. Assuming, for example, that Romex cable 12 is the live wire, a potential will be impressed on the terminal strips 42 and 44 so that of course the voltage will in turn be impressed on the conductors of the Romex cables 14 and 16. Accordingly, the Romex cables 14 and 16 may then be extended to additional room outlets.

In order to prevent mechanical stress on the terminal screws 48, which would loosen the securement between the terminal screw 48 and the conductor 60, setscrews as 62 are received in cavities 64 formed in the bottom 22 of the lower box member 20. The head of the setscrew 62 is retained within the cavity 64 while the threaded shank portion of the screw extends through the lower box member 20 and communicate the openings with the cavities. Although the apron 38 on the depending wall 36 bears against and secures the wire in the openings, the setscrews 62 may be used in addition thereto, if desired.

In order to retain the junction box 10 on a wall or such, apertures 66 are formed in the lower box member 20 to receive fasteners, as screws therethrough to secure the box on a wall or such.

From the foregoing, it will be appreciated that the applicant has provided a novel junction box construction where by the removal of the bolts 32, the upper box member 18 may be removed from the lower box member 20 which is retained on a wall or such. The Romex cables may then be inserted through the defined openings and the conductors of each cable may be electrically secured to the proper terminal strips. Although it is contemplated that the extension box disclosed is for utilization with single phase 110–220 volt systems, of course, these teachings may be adapted to systems having other ratings. In order to facilitate the utilization of the box 10, it is contemplated that indicia be placed on the box, inside or outside, for indicating or recording the circuits to which the respective cables extend and control.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A junction box through the medium of which a plurality of cable-ends may be assembled and separably but reliably connected together comprising a pair of alignable cooperating upper and lower box members, said lower box member embodying a bottom wall constituting a base having an exterior surface designed and adapted to be positioned against and secured to a support member, the central area portion of said bottom wall having holes therein to accommodate nails or equivalent fasteners, the top side of said bottom wall being provided with an upstanding endless wall having spaced parallel portions which provide seating surfaces, the inner peripheral surfaces of said upstanding wall being spaced from said holes, the outer peripheral surface of said wall being spaced inwardly from outer marginal edges of said bottom wall, the projecting portions of the bottom wall thus provided defining an outstanding ledge constituting a shoulder, said upstanding wall being provided with circumferentially spaced individual cable openings which are open-ended and adapted to permit passage of the terminal end portions of cables therethrough into the space circumscribed by said upstanding wall, portions of the shoulder being provided with circumferentially spaced upwardly opening cable seating grooves, the grooves being aligned with the outer open ends of their respectively cooperable cable openings, a pair of individual coplanar spaced parallel current conducting strips individually mounted and secured to the top of said seating surfaces and provided with selectively usable terminal binding screws to facilitate connection of electrically conductive wires to said strips at spaced-apart points on the strip, the upper portions of said cable openings being in a plane below the elevated plane of said strips, the bottom marginal edge portions of said bottom wall being provided with countersunk cable retaining screws, the individual screws being registrable with their intended cable openings, and said upper box section comprising a cover having a top wall and a lateral rim wall, said rim wall having an edge portion resting atop the aforementioned shoulder and bridging the seating notches, portions of the rim walls resting upon available areas of the aforementioned seating surfaces.

2. A junction box for Romex cables comprising a pair of complemental cooperating alignable upper and lower box members, said lower box member embodying a bottom wall constituting a base, the top of said wall being provided with an upstanding wall having coplanar spaced parallel strip seating surfaces, the outer peripheral surface of said upstanding wall being spaced inwardly from and circumscribed by an outstanding ledge-like shoulder, said upstanding wall being provided with spaced individual openings designed to permit passage of terminal end portions of Romex cables therethrough and into the space circumscribed by said upstanding wall, portions of said openings opening upwardly through the top surface of said shoulder in a manner to expose a portion of the cable passing through the opening, a pair of individual coplanar spaced parallel current conducting strips individually mounted and secured atop said strip seating surfaces and provided with selectively usable terminal binding screws to facilitate connection of electrically conductive wires to said strips at spaced-apart points on the strips, the upper portions of said openings being in a plane below the elevated plane of said strips, said upper box member comprising a cover having a top wall and a lateral rim wall, said rim wall having an edge portion resting atop cooperating surfaces of said upstanding wall and further provided with apron portions of reduced cross-sectional thickness resting atop coacting top surfaces of said shoulder with portions bridging the portions of the openings which open upwardly through said shoulder, and bolts fastening the box members together and securely binding said box members together, the bottom wall of said lower box member being provided in alignment with each opening with accessible setscrews having shank portions projecting into the openings and adapted to engage the cables to assist in anchoring the cables in place and to minimize the likelihood of the cables becoming disconnected from the junction box.

References Cited in the file of this patent

UNITED STATES PATENTS

| | | |
|---|---|---|
| 838,886 | McGowan | Dec. 18, 1906 |
| 1,041,473 | Hogan | Oct. 15, 1912 |
| 1,445,072 | Cook | Feb. 13, 1923 |
| 1,932,746 | McArdle | Oct. 31, 1933 |
| 1,964,871 | Cook | July 3, 1934 |
| 2,175,146 | Davison | Oct. 3, 1939 |
| 2,324,791 | McLoughlin et al. | July 20, 1943 |
| 2,383,518 | Schonitzer et al. | Aug. 28, 1945 |
| 2,863,935 | Barina | Dec. 9, 1958 |

FOREIGN PATENTS

| | | |
|---|---|---|
| 428,785 | Italy | Jan. 3, 1948 |
| 877,164 | Germany | May 21, 1953 |